United States Patent Office 3,203,990
Patented Aug. 31, 1965

3,203,990
2-AMINO-2'-HALO-5-NITRO BENZOPHENONES
Oscar Keller, Clifton, Norbert Steiger, Nutley, and Leo
Henryk Sternbach, Upper Montclair, N.J., assignors to
Hoffmann-La Roche Inc., Nutley, N.J., a corporation
of New Jersey
No Drawing. Filed Mar. 21, 1962, Ser. No. 181,443
6 Claims. (Cl. 260—570)

This is a continuation-in-part of application Serial No. 104,227, filed April 20, 1961, which in turn is a continuation-in-part of Serial No. 38,732, filed June 27, 1960, and now abandoned.

This invention relates to substituted benzodiazepine compounds which have been found to possess valuable therapeutic properties. The invention also deals with intermediates for said compounds and methods of making said compounds. The benzodiazepine compounds of this invention all contain a phenyl substituent in the 5-position. Furthermore, either on the 5-position phenyl substituent or on the fused benzene ring all the benzodiazepine compounds of the invention contain a nitrogen containing substituent. More specifically, the benzodiazepine compounds of this invention are those chosen from the group consisting of nitrogen containing-substituent substituted 5-phenyl-2-amino-3H - 1,4 - benzodiazepine 4-oxides, 5-phenyl-3H-1,4-benzodiazepin-2(1H)-ones, 5-phenyl-4,5-dihydro-3H-1,4-benzodiazepin-2(1H)-ones and 5-phenyl-3H-1,4-benzodiazepin-2(1H)-one 4 oxides.

Thus, certain compounds of the invention are selected from the group consisting of compounds of the formula (I)

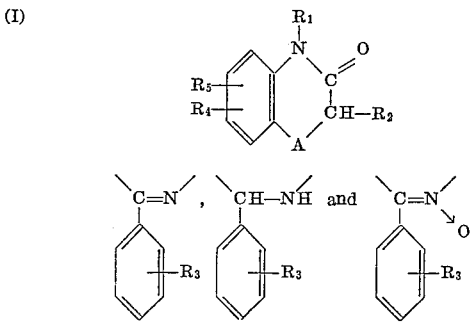

wherein A represents a carbon nitrogen linkage which completes the 7-membered diazepine ring and which is selected from the group consisting of (II)

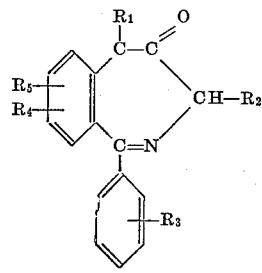

$R_1$ and $R_2$ are each selected from the group consisting of hydrogen and lower alkyl; and $R_3$, $R_4$ and $R_5$ are each selected from the group consisting of hydrogen, halogen, lower alkyl, nitro, amino, and lower acylamino;

at least one of $R_3$, $R_4$ and $R_5$ being a nitrogen containing group.

More particularly, the formulas of the respective benzodiazepinones can be set forth as follows:

(III)

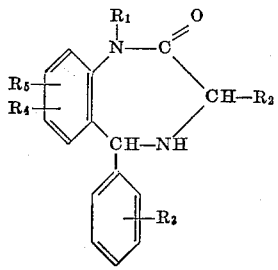

(IV)

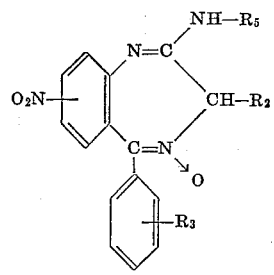

As used in this disclosure, the term lower alkyl includes saturated branched chain or straight chain aliphatic hydrocarbon groups such as ethyl, methyl, propyl, isopropyl, n-butyl, iso-butyl, t-butyl, amyl and the like. The term halogen includes all four halogens, i.e. chlorine, bromine, iodine and fluorine. The lower acylamino groups represented by $R_3$, $R_4$ and $R_5$ are those in which the acyl radicals are derived from lower fatty (alkanoic) acids, forming groups such as acetylamino, propionylamino and the like.

Certain other components of the invention are selected from the group consisting of compounds of the formula (V)

wherein $R_2$ and $R_5$ are selected from the group consisting of hydrogen and lower alkyl, and $R_3$ is selected from the group consisting of hydrogen, halogen, lower alkyl, nitro, amino and lower acylamino.

The basic benzodiazepine compounds of this invention, i.e. the compounds of Formula I above (which is inclusive of the compounds of Formulas II through IV above) and the compounds of Formula V above (form acid addition salts. Since these compounds are valuable therapeutic agents, medicinally acceptable acid addition salts formed from phermaceutically acceptable acids are preferred. These basic compounds of Formulas I through V above form pharmaceutically acceptable acid addition salts with both organic and inorganic acids, such as hydrochloric acid, nitric acid, hydrobromic acid, p-toluene sulfonic acid, citric acid, maleic acid, succinic acid, mandelic acid, acetic acid, sulfuric acid, phosphoric acid, tartaric acid, and the like.

The compounds of this invention are derived from substituted 2-aminobenzophenones. Several synthetic routes can be employed.

According to one method, a substituted 2-aminobenzophenone, such as 5-nitro-2-aminobenzophenone, 5-nitro-2-methylaminobenzophenone, and the like is reacted with an α-amino acid or an ester thereof conforming to the formula (VI) 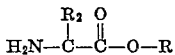

wherein $R_a$ is selected from the group consisting of lower alkyl and hydrogen and R is selected from the group consisting of lower alkyl and hydrogen.

For example, glycine and lower alkyl glycine esters can be used. Ring closure occurs and a benzodiazepinone conforming to Formula III above is obtained wherein $R_2$ is hydrogen and $R_1$, $R_3$, $R_4$ and $R_5$ correspond to the substituents on the 2-aminobenzophenone used as starting material. The use of longer chain α-amino acid answering to the Formula VI above wherein $R_2$ is lower alkyl, e.g., alanine, results in a compound of Formula III wherein $R_2$ is a lower alkyl group, i.e., a benzodiazepinone containing a lower alkyl substituent in the 3-position.

The reaction of the 2-aminobenzophenone and α-amino acid is preferably effected in a solvent such as pyridine, dimethylformamide or the like. It is also preferable to utilize one of the materials present in the form of a salt of a strong organic or inorganic acid, e.g., glycine hydrochloride, glycine ethyl ester hydrochloride, alanine hydrochloride, pyridine hydrochloride, or the like.

According to an alternate method, the substituted 2-aminobenzophenone can be haloacylated, such as with bromoacetyl bromide, α-bromopropionyl bromide, chloroacetyl chloride, or the like, to yield a 2-(α-halo-lower alkanoylamino)-benzophenone of the formula (VII) 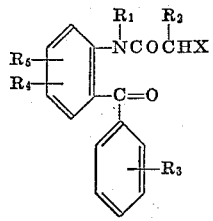

wherein X is halogen; $R_1$ and $R_2$ are each selected from the group consisting of hydrogen and lower alkyl; $R_3$, $R_4$ and $R_5$ are each selected from the group consisting of hydrogen, halogen, lower alkyl, nitro, amino and lower acylamino; at least one of $R_3$, $R_4$ and $R_5$ being a nitrogen containing group.

The resultant haloacylated-2-aminobenzophenone can then be treated with ammonia. This treatment with ammonia effects ring closure to obtain a benzodiazepinone conforming to Formula III above. It is most convenient from a viewpoint of operating economically and ease of handling to use alcoholic ammonia; however, other ammonia solutions can be used as is readily apaprent to those skilled in the art.

Benzodiazepinones conforming to Formula III above can also be prepared by cyclizing a 2-(α-amino-lower alkanoylamino)-benzophenone. These 2-(α-amino-lower alkanoylamino)-benzophenones, their production, and their cyclization are not a part of this invention but are disclosed herewith in order that the present disclosure may be complete.

Compounds corresponding to Formula II above can be prepared by treating a 2-halomethyl-4-phenyl-quinazoline 3-oxide of the formula (VIII) 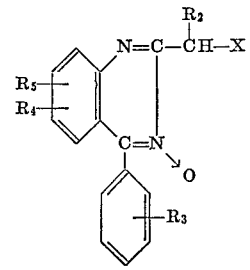

wherein $R_2$ is selected from the group consisting of lower alkyl and hydrogen; $R_3$, $R_4$ and $R_5$ are each selected from the group consisting of hydrogen, halogen, lower alkyl, nitro, amino and lower acylamino; at least one of $R_3$, $R_4$ and $R_5$ being a nitrogen containing group; and X is halogen with alkali hydroxides, such as sodium hydroxide, potassium hydroxide or the like.

Compounds corresponding to Formula IV above wherein one of $R_3$, $R_4$ and $R_5$ is nitro can be prepared by hydrogenating a 5-phenyl-3H-1,4-benzodiazepin-2(1H)-ones not containing a nitro group and nitrating the resulting compound. Compounds corresponding to Formula IV above wherein one of $R_3$, $R_4$ and $R_5$ is amino can be prepared by hydrogenation of either a nitro-substituted 5-phenyl-3H-1,4-benzodiazepin-2(1H)-one or a nitro-substituted 4,5-dihydro-5-phenyl-3H-1,4-benzodiazepin-2-(1H)-one. The above referred to hydrogenation can be effected by conventional hydrogenation means, such as by hydrogenating in the presence of platinum oxide, Raney nickel or other conventional hydrogenation catalysts.

Compounds of Formula V above can be prepared from compounds of Formula VIII by reacting said compounds of Formula VIII with ammonia or with a primary amine whereby the 6-membered heterocyclic ring of the quinazoline is enlarged to the 7-membered heterocyclic ring of the benzodiazepine structure.

Compounds corresponding to Formulas I through V above which contain a nitro group on either the fused benzene ring or on the 5-position phenyl ring can be converted to the corresponding amino compound by reducing the nitro group, for example, catalytically in the presence of Raney nickel. A lower alkanoyl group can be attached to the amino group by reacting with a lower alkanoic acid anhydride, such as acetic anhydride.

The compounds corresponding to Formulas I through V above wherein $R_1$ is hydrogen can be alkylated in the 1-position, for example, by forming the sodio derivative with a sodium alcoholate such as sodium methoxide in toluene and then reacting the sodio derivative with a dialkyl sulfate or an alkyl halide in an inert solvent, for example a hydrocarbon or dimethylformamide.

It is also possible, as a further alternative, to first produce a 2 - amino - 5 - phenyl - 3H - 1,4 - benzodiazepine 4 - oxide; 5 - phenyl - 3H - 1,4 - benzodiazepin-2(1H) - one 4 - oxide; 5 - phenyl - 3H - 1,4 - benzodiazepin - 2(1H) - one or 4,5 - dihydro - 5 - phenyl - 3H-1,4 - benzodiazepin - 2(1H) - one derivative, either containing no substituent, or a group such as a halogen or lower alkyl on the p-position phenyl ring or on the fused benzene ring, and then introduce a nitro group by nitration with nitric acid. One or two nitro groups may be introduced in this manner. The 2 - amino - 5 - phenyl-3H - 1,4 - benzodiazepine 4 - oxide; 5 - phenyl-3H-1,4-benzodiazepin - 2(1H) - one 4 - oxide; 5 - phenyl - 1,4 - benzodiazepin - 2(1H) - one or 4,5 - dihydro - 5-phenyl - 3H - 1,4 - benzodiazepin - 2(1H) - one compounds referred to above which do not contain a nitrogen containing group are not a part of this invention but their preparation is disclosed herein in order that the present disclosure may be complete.

The compounds corresponding to Formula VIII above can be prepared by first acylating with an α-haloacylhalide or -anhydride compounds of the formula (IX)
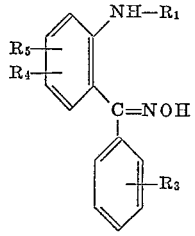

wherein $R_1$ is selected from the group conissting of hydrogen and lower alkyl; $R_3$, $R_4$ and $R_5$ are each selected from the group consisting of hydrogen, halogen, lower alkyl, nitro, amino and lower acylamino; at least one of $R_3$, $R_4$ and $R_5$ being a nitrogen containing group, and then effecting ring closure to a compound of Formula VIII via dehydration by acids, such as hydrogen chloride, concentrated sulfuric acid, and the like.

Certain of the 2-aminobenzophenones used as intermediates herein are novel compounds and are included within the scope of the invention.

The compounds described above conforming to Formulas I through V are useful as muscle relaxants and anti-convulsants. They can be used for the relief of tension and also in depressed states associated with tension. They can be administered by incorporating a therapeutic dosage of the compound, or a pharmacologically acceptable acid addition salt when formed, adjusted according to its nature and individual requirements, in a conventional liquid or solid vehicle to provide elixirs, suspensions, tablets, capsules, powders or the like according to conventional pharmaceutical practice.

Certain of the intermediates which are used in the production of the compounds of the formulas shown above are novel. The method of producing such compounds is evident from the working examples which disclose their synthesis in detail. The following examples are illustrative and not limitative of the invention. All temperatures are expressed in degrees centigrade.

Example 1

A mixture of 72 g. (0.30 mole) of 2 - amino - 5 - nitrobenzophenone, 34 g. of hydroxylamine hydrochloride, 90 g. of powdered KOH, 500 cc. of alcohol and 25 cc. of water was refluxed on a steam bath with stirring for 15 minutes. It was then cooled to room temperature and poured into a solution of 160° cc. concentrated HCl in 1000 cc. of water. The suspension of the precipitated crude product was cooled in ice and then filtered off, washed acid-free with ice water, and sucked dry, and crystallized from ethanol in needles, giving 2 - amino - 5 - nitrobenzophenone oxime, M.P.=203–205°.

Example 2

To a suspension of 10 g. (0.039 mole) of 2-amino-5-nitro-benzophenone oxime in 100 cc. of acetic acid, warmed to 50–60°, 6 cc. (0.08 mole) of chloracetyl chloride was added in small portions, with stirring. The resulting brown solution was stirred at 50–60° for 3 hours and then allowed to stand at room temperature overnight.

The reaction mixture was then saturated with hydrogen chloride and concentrated in vacuo. The residue was dissolved in 200 cc. of warm methylene chloride and was then cooled to 0°. 50 g. of crushed ice was added to the reaction mixture, then 30 cc. 1 N NaOH dropwise until a pH of 8–9 was reached. The mixture was transferred to a separatory funnel and 150 cc. water were added. The organic phase was separated and dried over $Na_2SO_4$.

The methylene chloride solution was treated with activated charcoal, filtered, and evaporated to dryness in vacuo to give a yellow crystalline residue. The crude product was purified by refluxing in a mixture of 200 cc. acetone and 100 cc. methylene chloride with 15 g. of activated charcoal. 2 - chloromethyl-4-phenyl-6-nitroquinazoline 3-oxide crystallized in yellow prisms on cooling of the filtered mixture. M.P.=205–207°.

Example 3

6.0 g. (0.019 mole) of 2-chloromethyl-4-phenyl-6-nitroquinazoline 3-oxide was added in portions to 150 cc. of a 25% solution of methylamine in methanol at 5° C. with cooling and stirring. After a few minutes, a yellow crystalline substance started to separate. The reaction mixture was stirred at room temperature for 24 hours then allowed to stand for another 24 hours. The yellow product was filtered off, washed with a little methanol, sucked dry, and crystallized in needles from ether-methanol giving 7-nitro-2-methylamino-5-phenyl-3H-1,4-benzodiazepine 4-oxide, which melted at 260–261° (dec.).

Example 4

6.3 g. (0.02 mol.) of 2-chloromethyl-4-phenyl-6-nitroquinazoline 3-oxide was suspended in 170 cc. of 12% ethanolic ammonia. The dark reddish brown solution was stirred for 24 hours at room temperature. The yellow prisms were filtered off, washed with ethanol, and sucked dry giving 2-amino-7-nitro-5-phenyl-3H-1,4,benzodiazepine 4-oxide. M.P.=243° (dec.).

Example 5

A mixture of 16.8 g. of 2-aminobenzophenone, 11.9 g. of glycine ethyl ester hydrochloride and 200 cc. of pyridine was heated to reflux. After one hour, 20 cc. of pyridine was distilled off. The solution was refluxed for 15 hours, then 11.9 g. of glycine ethyl ester hydrochloride was added and the refluxing was continued for an additional 4 hours. The reaction mixture was concentrated in vacuo, then diluted with ether and water. The reaction product, 5 - phenyl - 3H - 1,4 - benzodiazepin - 2(1H) - one, crystallized out, was filtered off and then recrystallized from acetone in the form of colorless rhombic prisms, M.P. 182–183°.

The above mentioned 5-phenyl-3H-1,4-benzodiazepin-2(1H)-one is not a part of this invention but its preparation is set forth above in order that this disclosure may be complete.

12 g. (0.05 mol.) of 5-phenyl-3H-1,4-benzodiazepin-2(1H)-one was dissolved in 16 cc. of concentrated sulfuric acid by stirring at room temperature for ½ hour. To the solution there was then added dropwise a cooled mixture of 3.5 cc. of concentrated sulfuric acid and 3.5 cc. of fuming nitric acid (90%—sp. gr.=1.50). The temperature of the reaction mixture slowly rose to 40°. The mixture was then stirred at 30° for 2 hours and allowed to stand at room temperature overnight. The reaction mixture was poured on 1 kg. of crushed ice with stirring and stirred for 2 hours. The yellow precipitate was then filtered off, washed with about 1.5 liters of ice water and dried overnight.

The crude product was ground and suspended in 200 cc. of water containing 50 cc. of 20% sodium acetate solution and a few drops of antifoam agent. After stirring for about ½ hour, the mixture was no longer acid to Congo red paper. The precipitate was then filtered off, washed with water and sucked dry. The product, 7,9-dinitro - 5 - phenyl - 3H - 1,4 - benzodiazepin - 2(1H) - one, was crystallized twice from 40% ethanol, and obtained as yellow needles melting at 240°.

Example 6

48 g. (0.2 mol.) of 5-phenyl-3H-1,4-benzodiazepin-2(1H)-one was dissolved in 250 cc. of concentrated sulfuric acid by stirring at 15° for ½ hour. The solution was then cooled to 0° and a mixture of 9.1 cc. of fuming nitric acid (90%—sp. gr.=1.50) and 11.8 cc. of concentrated sulfuric acid was added dropwise with stirring, keeping the temperature of the reaction mixture between −5° and 0°. After completion of the addition of the nitric acid-sulfuric acid mixture, stirring was continued for 1 hour an the reaction mixture was stored in the refrigerator overnight.

The mixture was then added dropwise to 2 kg. of crushed ice with stirring and cooling, keeping the temperature at 0°. After 1 hour of stirring in the cold, 640 cc. of concentrated ammonium hydroxide was added dropwise at 0° to pH 8. Stirring was continued for ½ hour and the crude product was filtered off, washed with a small amount of ice water and sucked dry overnight. The crude product was suspended in a mixture of 100 cc. of methylene chloride and 1700 cc. of alcohol. 50 g. of decolorizing charcoal was added and the mixture was refluxed with stirring for 2 hours. After standing overnight at room temperature 15 g. of diatomaceous earth filter aid was added and the refluxing was resumed for 1½ hours. The mixture was filtered while hot. The clear, light yellow filtrate was concentrated in vacuo on the steam bath with stirring to about 600 cc. The concentrate was stirred and cooled in ice for about 2 hours; the precipitated crystalline product was filtered off, washed with some petroleum ether and sucked dry. The product, 7-nitro-5-phenyl-3H-1,4-benzodiazepin-2(1H)-one, was recrystallized from a mixture of 1000 cc. of alcohol and 50 cc. of methylene chloride to obtain white prisms melting at 224–225°.

*Example 7*

12 g. (0.05 mol.) of 5-phenyl-3H-1,4-benzodiazepin-2(1H)-one were dissolved in 65 cc. of concentrated sulfuric acid by stirring at 10°. The mixture was cooled to 0° and to it was added dropwise within 1 hour, a solution of 5.3 g. of potassium nitrate in 30 cc. of concentrated sulfuric acid, keeping the reaction temperature below 25°. The mixture was warmed to 50° for 2½ hours and then added dropwise to 500 g. of crushed ice with stirring and cooling to 0°.

After standing overnight in the refrigerator, the reaction mixture was neutralized to pH 8 by the dropwise addition of 260 cc. of concentrated ammonia at 0°. The crude material was filtered off, washed with some ice water, sucked dry, then crystallized from 125 cc. of boiling chlorobenzene. The product, 7-nitro-5-phenyl-3H-1,4-benzodiazepin-2(1H)-one, was obtained in the form of light yellow prisms.

*Example 8*

A suspension of 5.6 g. (0.02 mol.) of 7-nitro-5-phenyl-3H-1,4-benzodiazepin-2(1H)-one was reduced catalytically in a shaking autoclave using Raney nickel as catalyst at 265 lbs. hydrogen pressure. The hydrogen uptake was 100% of theory at 58°. The catalyst was filtered off and the clear, almost colorless filtrate was concentrated in vacuo to dryness. The residue was crystallized from a mixture of 75 cc. of acetonitrile and 25 cc. of ethanol to obtain colorless prisms of 7-amino-5-phenyl-3H-1,4-benzodiazepin-2(1H)-one melting at 236–239°.

*Example 9*

14 g. (0.056 mol.) of 7-amino-5-phenyl-3H-1,4-benzodiazepin-2(1H)-one and 100 cc. of pyridine were stirred in a water bath at 40° for 1 hour to obtain a fine suspension. 15 cc. of acetic anhydride was added dropwise at 10 to 15° with slight cooling. A clear solution resulted which was stirred at room temperature for 3 hours. After standing overnight at room temperature, the slightly brownish reaction mixture was evaporated to dryness in vacuo on the steam bath. Several portions of ethanol were added and distilled off to remove traces of acetic anhydride. The residue was refluxed in 500 cc. of ethanol and filtered while hot. After concentrating the filtrate to 200 cc., the pure product, 7-acetamido-5-phenyl-3H-1,4-benzodiazepin-2(1H)-one, separated in white needles melting at 278–279°.

*Example 10*

137 g. (1 mol.) of anthranilic acid was dissolved in 250 cc. dimethylformamide. The solution was cooled to 0° and 85 cc. (155 g.=1.3 mol.) of thionyl chloride was added dropwise, keeping the temperature of the reaction mixture below 40°. After allowing the mixture to cool to room temperature, 750 cc. of acetone was added. It was then cooled to 0°. The white 2-dimethylformamidinoanthranilic acid hydrochloride which separated was filtered off, washed with 300 cc. of cold acetone and sucked dry, M.P. 215–217°.

To a stirred suspension of 58 g. (0.25 mol.) of 2-dimethylformamidinoanthranilic acid hydrochloride in 750 cc. of chlorobenzene was added in portions 60 g. of phosphorus pentachloride. The mixture was heated on the steam bath for 2 hours and cooled in ice to 10°. 135 g. of aluminum chloride was added in 4 portions, keeping the temperature of the reaction mixture below 10°. After completion of the addition of the aluminum chloride, the mixture was heated on the steam bath for 3 hours at 95°.

The reaction mixture was cooled in ice and 400 g. of crushed ice was added in portions, keeping the temperature below 40°. Next, 500 cc. of 40% sodium hydroxide was added dropwise, again keeping the temperature of the reaction mixture below 40°. The pH at this point was about 11. Heating on the steam bath at 95° for 4 hours followed, then cooling to 40°. The mixture was transferred to a separatory funnel and the chlorobenzene phase was separated. The aqueous phase was extracted with three 100 cc. portions of chlorobenzene and the combined chlorobenzene phases were concentrated in vacuo on the steam bath, yielding an oily residue. The oil was refluxed with stirring in a mixture of 150 cc. of ethanol, 75 cc. of water and 75 cc. of 10% sodium hydroxide for 24 hours. The solvents were distilled off at atmospheric pressure, the mixture was cooled and 500 cc. of water was added dropwise with stirring. After standing in the refrigerator overnight, the solid yellow product, 2-amino-4'-chlorobenzophenone, was filtered off, sucked dry, dried in vacuo at room temperature over sodium hydroxide, then crystallized from 200 cc. of hot ethanol in the form of yellow needles, M.P. 98–99°.

A stirred mixture of 15.5 g. (0.067 mol.) of 2-amino-4'-chlorobenzophenone, 35 cc. of pyridine and 15 g. (0.1 mol.) glycine ethyl ester hydrochloride was slowly distilled at 115-120°, with the pyridine being replaced dropwise to keep the volume unchanged. After 5 hours, the reaction mixture was concentrated to dryness in vacuo. The residue was heated on the steam bath with 50 cc. of benzene and 50 cc. of water. The extract was decanted and the residue was reextracted with 50 cc. of benzene and 50 cc. of water. The insoluble brown precipitate was filtered off and sucked dry. The crude product, 5-(p-chlorophenyl)-3H-1,4-benzodiazepin-2(1H)-one, was recrystallized twice from ethanol to obtain white plates melting at 262–263°.

The above mentioned 5-(p-chlorophenyl)-3H-1,4,benzodiazepin-2(1H)-one is not a part of this invention but its preparation is set forth above in order that this disclosure may be complete.

33 g. (0.12 mol.) of 5-(p-chlorophenyl)-3H-1,4-benzodiazepin-2(1H)-one were dissolved in 158 cc. of concentrated sulfuric acid by stirring for ½ hour. The solution was cooled to 0° and a mixture of 6.1 cc. of 90% fuming nitric acid (sp. gr.=1.50) and 7.3 cc. of concentrated sulfuric acid was added dropwise at −5 to 0°. After an additional stirring period of 2 hours in the cold, the reaction mixture was added dropwise to 750 g. of crushed ice with stirring at 0°. The suspension was neutralized by the dropwise addition of 390 cc. of ammonium hydroxide at 0°. The crude yellow product was filtered off, washed with 1 liter of ice water and sucked dry overnight.

Purification was accompanied by refluxing the crude material for 2 hours in a mixture of 500 cc. of ethanol, 500 cc. of methylene chloride, 35 g. of charcoal and 15 g. of filter aid. After filtration, the light yellow filtrate was concentrated in vacuo with stirring to about 500 cc. Cooling of the concentrate in ice yielded the pure compound, 7-nitro-(5-p-chlorophenyl)-3H-1,4-benzodiazepin-2(1H)-one, in white plates, which melted at 253–254°.

*Example 11*

To a solution of 7.26 g. (30 mmol.) of 2-amino-5-nitrobenzophenone in 350 cc. of benzene was added 2.8 cc. (60 mmol.) of bromoacetyl bromide. Dry air was blown through the solution until all the hydrogen bromide was removed. The benzene solution was washed with water until the washings were neutral, then dried over sodium sulfate and concentrated in vacuo. The residue was crystallized from a mixture of benzene and petroleum ether to give 2-bromoacetamido-5-nitrobenzophenone in the form of colorless needles melting at 155–156°.

*Example 12*

A solution of 2 g. of 2-bromoacetamido-5-nitrobenzophenone in 30 cc. of dioxane was treated with 10 cc. of a 13% solution of ammonia in methanol. The solution was allowed to stand at room temperature for 16 hours and then concentrated in vacuo at a water bath temperature of 25°. The residue was partitioned between 50 cc. of ether and 50 cc. of 0.3 N hydrochloric acid. The ether solution was again extracted with 50 cc. of 0.3 N hydrochloric acid and the combined acid extracts were filtered and made alkaline with ammonium hydroxide. The precipitated product was filtered and dried in vacuo to give 2-aminoacetamido-5-nitrobenzophenone melting at 156–158° (dec.). Recrystallization from chloroform-ether gave light straw-colored needles melting at 166–167° (dec.).

The aqueous solution was neutralized with hydrochloric acid and deposited, on standing, fawn-colored crystals of 7-nitro-5-phenyl-3H-1,4-benzodiazepin-2(1H)-one.

2-aminoacetamido-5-nitrobenzophenone was heated for 5 minutes at 165–187°. The compound melted, frothed, and resolidified. The mass was dissolved in chloroform and decolorized with charcoal. The chloroform solution was concentrated in vacuo and treated with ether to yield crystalline 7-nitro-5-phenyl-3H-1,4-benzodiazepin-2(1H)-one.

A solution of 2.42 g. (10 mmol.) of 2-amino-5-nitrobenzophenone and 4.2 g. (30 mmol.) of glycine ethyl ester hydrochloride in 75 cc. of pyridine was refluxed for 16 hours. The pyridine was removed in vacuo and the residue was partitioned between 100 cc. of benzene and 100 cc. of water. The benzene solution was extracted with 80 cc. of 1 N sodium hydroxide and the alkaline extract was neutralized with dilute hydrochloric acid. The precipitate was filtered off, dried, then dissolved in chloroform and filtered from insoluble material. The chloroform solution was concentrated in vacuo and the residue crystallized from ether to yield crystalline 7-nitro-5-phenyl-3H-1,4-benzodiazepin-2(1H)-one.

The 2-aminoacetamido-5-nitrobenzophenone compound referred to above is not a part of this invention, but its preparation is set forth above in order that this disclosure may be complete.

*Example 13*

A solution of 2.2 g. (9.1 mmol.) of 2-amino-4-nitrobenzophenone in 150 cc. of benzene and 30 cc. of ether was treated with 0.75 cc. (9.1 mmol.) of bromoacetyl bromide. After standing for 5 minutes, the solution was washed with 150 cc. of water and the procedure was repeated with further quantities of bromoacetyl bromide and water until the yellow color of the solution had disappeared. The organic layer was washed with water until the washings were neutral and was then dried over sodium sulfate and concentrated in vacuo. The residue was crystallized first from hexane-ether and then hexane-chloroform to give 2-bromoacetamido-4-nitrobenzophenone in the form of straw-colored plates melting at 120–121°.

*Example 14*

A solution of 2.03 g. (5.6 mmol.) of 2-bromoacetamido-4-nitrobenzophenone in a mixture of 100 cc. of ether and 50 cc. of a 10% solution of ammonia in methanol (wt./vol.) was allowed to stand at room temperature for 18 hours. The solution was then concentrated to dryness in vacuo with a wet bath temperature at 30°. The residue was partitioned between ether and water and some insoluble material was filtered off. The ether solution was dried over sodium sulfate and concentrated in vacuo. The residue was extracted with hot benzene to leave undissolved material melting at 243° (dec.). The two batches of insoluble material were combined and recrystallized from ethanol after treatment with charcoal to obtain colorless prisms of 8-nitro-5-phenyl-3H-1,4-benzodiazepin-2(1H)-one melting at 252° (dec.).

*Example 15*

A stirred solution of 75 g. of 2-amino-2'-nitrobenzophenone in 700 ml. of hot concentrated hydrochloric acid was cooled to 0° and a solution of 21.5 g. of sodium nitrite in 50 ml. of water was added in the course of 3 hours. The temperature of the suspension was kept at 2–7° during the addition. The resulting clear solution was poured into a stirred solution of 37 g. cuprous chloride in 350 ml. of hydrochloric acid 1:1. The solid which had formed after a few minutes was filtered off, washed with water and recrystallized from ethanol. Crystals of 2-chloro-2'-nitrobenzophenone melting at 76–79° were obtained.

A solution of 20 g. of 2-chloro-2'-nitrobenzophenone in 450 ml. of ethanol was hydrogenated at normal pressure and room temperature with Raney nickel. After uptake of ca. 6 liters of hydrogen the catalyst was filtered off, and the alcohol then removed in vacuo. The residue was distilled in a bulb tube at 0.4 mm. and a bath temperature of 150–165° giving a yellow oil. The oil was dissolved in alcohol, and on addition of water, needles of 2-amino-2'-chlorobenzophenone melting at 58–60° were obtained.

To a solution of 42 g. of 2-amino-2'-chlorobenzophenone in 500 ml. of benzene, 19 ml. of bromoacetyl bromide was added dropwise. After refluxing for 2 hours, the solution was cooled, washed with 2 N sodium hydroxide and evaporated. The residue was recrystallized from methanol giving crystals of 2-bromo-2'-(2-chlorobenzoyl)acetanilide melting at 119–121°.

To a solution of 14.5 g. of 2-bromo-2'-(2-chlorobenzoyl)acetanilide in 100 ml. of tetra hydrofuran, an excess of liquid ammonia (ca. 150 ml.) was added. The ammonia was kept refluxing with a Dry-Ice condenser for 3 hours after which time the ammonia was allowed to evaporate and the solution was poured into water. Crystals of 2-amino-2'-(2-chlorobenzoyl)acetanilide were collected, which after recrystallization from ethanol melted at 162–164°.

A solution of 3 g. of 2-amino-2'-(2-chlorobenzoyl)-acetanilide in 50 ml. of pyridine was refluxed for 24 hours after which time the pyridine was removed in vacuo. The residue was recrystallized from methonal and a mixture of dichloromethane and ether giving crystals of 5-(2-chlorophenyl)-3H-1,4-benzodiazepin-2(1H)-one melting at 212–213°.

The 5 - (2-chlorophenyl)-3H-1,4-benzodiazepin-2(1H)-one mentioned above is not a part of this invention but intermediates therefor and its preparation are set forth above in order that this disclosure may be complete.

To a solution of 13.5 g. of 5-(2-chlorophenyl)-3H-1,4-benzodiazepin-2(1H)-one in 60 ml. of concentrated sulfuric acid, a solution of 5.5 g. of potassium nitrate in 20 ml. concentrated sulfuric acid was added dropwise. The solution then was heated in a bath at 45–50° for 2½ hours, cooled and poured on ice. After neutralizing with ammonia, the formed precipitate was filtered off and boiled with ethanol. A small amount of white insoluble material was then filtered off. The alcoholic solution on concentration yielded crystals of 7-nitro-5-(2-chlorophenyl)-3H-1,4-benzodiazepin-2(1H)-one which, after recrystallization from dichloromethane, melted at 238–240°.

*Example 16*

7 - nitro - 5 - (2-chlorophenyl)-3H-1,4-benzodiazepin-2(1H)-one (4.6 g.) was dissolved in 14.5 ml. of 1 N solution of sodium methoxide in methanol. After removing the solvent in vacuo the residue was dissolved in 50 ml. of dimethylformamide and 10 ml. of methyl iodide was added. The solution was permitted to stand for 3 hours and the solvent then distilled off in vacuo. The residue was recrystallized from a mixture of dichloromethane and ether yielding crystals of 1-methyl-5-(2-chlorophenyl)-7-nitro-3H-1,4-benzodiazepin-2(1H)-one melting at 194–195°.

*Example 17*

A solution of 2.25 g. (9.3 mmol.) of 2-amino-5-nitrobenzophenone in 150 cc. of benzene was treated with 2 cc. (18.6 mmol.) of α-bromopropionyl bromide. Dry air was blown through the solution for one hour until the hydrogen bromide had been removed. The solution was then concentrated in vacuo and the residue was crystallized from ether. The 2-(α-bromopropionamido)-5-nitrobenzophenone was recrystallized from a mixture of chloroform and hexane to obtain light straw-colored needles melting at 116–117°.

*Example 18*

A solution of 2.37 g. (6.3 mmol.) of 2-(2′-bromopropionamido)-5-nitrobenzophenone in 40 cc. of dioxane and 10 cc. of a 13% solution of ammonia in methanol (wt./vol.) was allowed to stand for 24 hours at room temperature. The solution was concentrated to dryness in vacuo and the residue was partitioned between water and an ether-methylene chloride mixture. The organic layer was dried over sodium sulfate, treated with charcoal and then concentrated in vacuo. The residue was chromatographed on a 10 g. alumina column using first a benzene-hexane eluant which removed the starting material and 2-amino-5-nitrobenzophenone. The column was then eluted with ether to obtain 7-nitro-5-phenyl-3-methyl-1,4-benzodiazepin-2(1H)-one which was isolated and melted at 219–221°.

*Example 19*

25 g. of anhydrous hydrogen chloride was introduced into a stirred mixture containing 23.2 g. of 2-amino-5-chlorobenzophenone, 15 g. of glycine and 250 cc. of pyridine. 25 cc. of pyridine was distilled off and the mixture was refluxed for 24 hours. 50 cc. of pyridine was then distilled off and an additional 25 g. of hydrogen chloride was introduced, followed by the distillation of 50 cc. of pyridine. Fresh pyridine was added after each distillation in order to keep the volume constant. The mixture was refluxed for an additional 24 hours and was then concentrated in vacuo. The residue was partitioned between benzene and water and then the benzene layer was washed with water. After drying over magnesium sulfate, the benzene solution was concentrated in vacuo. The residue, 7 - chloro-5-phenyl-3H-1,4-benzodiazepin-2(1H)-one, was crystallized from a mixture of ether-petroleum ether and washed with boiling ether, M.P. 216–217°.

The 7 - chloro - 5-phenyl-3H-1,4-benzodiazepin-2(1H)-one referred to above is not a part of this invention, but its preparation is set forth in order that this disclosure may be complete.

To a solution of 13.5 g. of 7-chloro-5-phenyl-3H-1,4-benzodiazepin-2(1H)-one in 65 cc. of concentrated sulfuric acid was added with vigorous stirring a mixture of 2.3 cc. of fuming nitric acid and 3 cc. of concentrated sulfuric acid while the temperature was kept below 0°. The reaction mixture was stirred for 1 hour at 0° and poured over ice. The mixture was neutralized with ammonium hydroxide. The precipitated crude reaction product was filtered off and washed with ether. After crystallization from methylene chloride, the product, 9-nitro-7-chloro-5-phenyl-3H-1,4-benzodiazepin-2(1H)-one, formed slightly yellow plates melting at 234–235°.

*Example 20*

A solution of 17.5 g. of 5-phenyl-3H-1,4-benzodiazepin-2(1H)-one in 100 cc. of glacial acetic acid was hydrogenated in the presence of 1.2 g. of platinum oxide at room temperature and atmospheric pressure. The hydrogen uptake stopped after 3 hours after the absorption of 1 mole of hydrogen. The mixture was filtered and the solution was concentrated in vacuo to dryness. The residue was dissolved in methylene chloride and extracted with a large volume of dilute hydrochloric acid. The methylene chloride solution was discarded and the aqueous layer was cooled, made alkaline and extracted again with methylene chloride. The organic layer was dried, filtered and concentrated in vacuo to dryness. The residue, 5-phenyl-4,5-dihydro - 3H - 1,4-benzodiazepin-2(1H)-one, was crystallized from acetone, then recrystallized from a mixture of acetone petroleum ether to obtain colorless needles melting at 147–148°.

The above mentioned 5 - phenyl - 4,5-dihydro-3H-1,4-benzodiazepin-2(1H)-one is not a part of this invention but its preparation is set forth in order that this disclosure may be complete.

To a solution of 4.7 g. of 5-phenyl-4,5-dihydro-3H-1,4-benzodiazepin-2(1H)-one in 35 cc. of concentrated sulfuric acid prepared at 0° was slowly added with vigorous stirring a mixture of 0.9 cc. of fuming nitric acid and 4 cc. of concentrated sulfuric acid. The solution was kept at 0° C., stirred for 1 hour and then poured over ice. The mixture was made alkaline with ammonium hydroxide and extracted with methylene chloride. The organic layer was dried, concentrated in vacuo to dryness and the residue crystallized from acetone. The crystalline reaction product was filtered off and recrystallized from a mixture of dimethylformamide and water. The pure compound, 7 - nitro - 5 - phenyl - 4,5 - dihydro-3H-1,4-benzodiazepin-2(1H)-one, formed colorless needles melting at 236–237° (dec.).

*Example 21*

5.6 g. (0.02 mol.) of 7-nitro-5-phenyl-3H-1,4-benzodiazepin-2(1H)-one was suspended in 75 cc. of methanol. 1.1 g. (0.022 mol.) of sodium methylate was added with stirring. The clear yellow-brown solution was concentrated to dryness in vacuo giving the yellow sodio derivative. This sodio derivative was dissolved in 70 cc. of dimethylformamide. 3.8 cc. (8.52 g.=0.06 mol.) of methyl iodide was added dropwise, the temperature rising to 30°. The reaction mixture was cooled and stirred for 1½ hours. The clear brown solution was added to about 500 cc. of ice and water with stirring. The fine yellow precipitate was filtered off, washed with ice water, sucked dry and dried in vacuo at 50° over sodium hydroxide. The pure 1 - methyl-7-nitro-5-phenyl-3H-1,4-benzodiazepin-2(1H)-one crystallized in needles from dilute ethanol and melted at 156–157°.

Hydrolysis of the compound obtained above in dilute hydrochloric acid gave 2-methylamino-5-nitrobenzophenone which crystallized in yellow needles from acetonitrile and melted at 159–161°.

*Example 22*

A solution of 1.95 g. (7.75 mmol.) of 2-amino-3-nitrobenzophenone in 60 ml. of nitromethane was treated with 2.15 ml. (23.25 mmol.) of bromoacetyl bromide. After standing for 15 minutes the color lightened noticeably. Dry air was then blown through the solution for 1½ hours to remove hydrogen bromide. The solution was partly concentrated, diluted with ether and washed with water until the washings were neutral. The organic layer was dried over sodium sulfate and concentrated in vacuo. The residue was crystallized from ether to give light-straw prisms of 2-bromoacetamido-3-nitrobenzophenone, melting at 120.5–121.5°.

*Example 23*

A solution of 1 g. (2.75 mmol.) of 2-bromoacetamido-3-nitrobenzophenone in 40 cc. of nitromethane was cooled in an ice bath and for 20 minutes saturated with ammonia. After standing 3 hours the solution was concentrated in vacuo. The residue was extracted from the inorganic salts with a mixture of ether and methylene chloride. The solution was treated with charcoal, filtered and concentrated in vacuo. The residue was crystallized from a mixture of benzene-hexane to give 9-nitro-5-phenyl-3H-1,4-benzodiazepin-2(1H)-one which, after recrystallization from ethanol, formed pale yellow needles melting at 144–145°.

*Example 24*

A solution of 4.5 g. (10.9 mmol.) of 2-(2'-bromopropionamido)-5-nitrobenzophenone in 100 cc. of nitromethane was saturated with ammonia and allowed to stand at room temperature for 70 hours. The solution was concentrated in vacuo at a water bath temperature of approximately 20°. The residue was dissolved in a methylene chloride-ether mixture and the inorganic salts were filtered off. The filtrate was concentrated in vacuo and the residue was crystallized from a mixture of benzene and hexane.

The benzene-hexane mother liquor was chromatographed on a column prepared with 130 g. of activated alumina. A mixture of benzene and hexane (5:2) was used as an eluant for the initial elution. On further elution with ether, 7-nitro-5-phenyl-3-methyl-3H-1,4-benzodiazepin-2(1H)-one was obtained. This was washed with ether and crystallized from a benzene-hexane mixture to give colorless needles melting at 219–221°.

*Example 25*

6.3 g. (0.02 mol.) of 2-chloromethyl-4-phenyl-6-nitroquinazoline 3-oxide was suspended in a mixture of 50 cc. ethanol and 20 cc. acetone. 24 cc. of normal NaOH was added dropwise, the reaction mixture turning a dark brown color (pH=9–10). The mixture was warmed to 40°, then stirred at room temperature overnight. The reaction mixture was then adjusted to pH 5 with dilute hydrochloric acid and concentrated in vacuo to dryness. The residue was refluxed with a mixture of 125 cc. ethanol and 30 cc. acetone. After filtration and concentration to 50 cc. a small amount of starting material was filtered off and 7-nitro-5-phenyl-3H-1,4-benzodiazepin-2(1H)-one 4-oxide was obtained by precipitation with petroleum ether. The pure product crystallized in yellow prisms from ethanol-petroleum ether and melted at 218–220° (dec.).

*Example 26*

To a solution of 21 g. of 2-amino-2'-nitrobenzophenone in 250 ml. of acetic acid a solution of 35 g. of bromine in 25 ml. of acetic acid was added dropwise in the course of 1½ hours. The temperature was kept at 20°. The solution was stirred for 22 hours, after which period the excess of bromine was removed in vacuo. The solution was then poured into water, the resulting precipitate filtered and crystallized from alcohol giving crystals of 2 - amino - 3,5-dibromo-2'-nitrobenzophenone melting at 167–169°.

*Example 27*

To a solution of 62 g. of 2-amino-2'-nitrobenzophenone in 250 ml. of dichloromethane, 27 ml. of bromoacetyl bromide was added dropwise. The solution was refluxed for 2 hours, cooled, washed with sodium bicarbonate solution, and evaporated to dryness. The residue was crystallized from benzene giving crystals of 2-(2-bromoacetamido)-2'-nitrobenzophenone melting at 157–159°.

To a solution of 20 g. of 2-(2-bromoacetamido)-2'-nitrobenzophenone in 200 ml. of tetrahydrofuran, an excess of liquid ammonia (ca. 200 ml.) was added. The ammonia was kept refluxing for 4 hours using a Dry-Ice condenser. Then the ammonia was allowed to evaporate slowly. After an over-all reaction time of 17 hours, the solution was concentrated in vacuo and poured into a sodium bicarbonate solution. The solid material was filtered off and recrystallized from alcohol yielding crystals of 2-amino-2'-(2-nitrobenzoyl)acetanilide melting at 157–159°. acetanilidee melting at 157–159°.

The above-mentioned 2-amino-2'-(2-nitrobenzoyl)acetanilide is not a part of this invention but its preparation is set forth above in order that this disclosure may be complete.

A solution of 5 g. of 2-amino-2'-(2-nitrobenzoyl)acetanilide in 50 ml. of pyridine was refluxed for 26 hours. After this time the pyridine was removed in vacuo and the residue dissolved in a boiling mixture of 9 ml. of alcohol, 45 ml. of concentrated hydrochloric acid and 45 ml. of water. Decolorizing carbon was added and after keeping the mixture on the steam bath for about 5–10 minutes all insoluble material was filtered off. The clear solution was cooled, neutralized with ammonia and extracted with a mixture of dichloromethane and ether. The organic phase was concentrated by evaporation and the residue recrystallized from benzene. Crystals of 5-(2 - nitrophenyl)-3H-1,4-benzodiazepin-2(1H)-one melting at 206–208° were obtained.

*Example 28*

To a solution of 3.3 g. of 5-(2-nitrophenyl)-3H-1,4-benzodiazepin-2(1H)-one in 15 ml. of concentrated sulfuric acid, 1.3 g. of potassium nitrate dissolved in 10 ml. of concentrated sulfuric acid was added dropwise. The temperature was kept at 25° for one hour after which the solution was heated for 3 hours in a bath of 50°.

After cooling, the solution was poured on ice and neutralized with ammonia. The solid material which had formed was filtered and crystallized from tetrahydrofuran yielding crystals of 7-nitro-5-(2-nitrophenyl)-3H-1,4-benzodiazepin-2(1H)-one which, after drying at 70° in vacuo, melted at 226–228°.

*Example 29*

To a solution of 2.8 g. of 7-nitro-5-(2-nitrophenyl)-3H-1,4-benzodiazepin-2(1H)-one in 20 ml. of methanol 8.5 ml. of a 1 N solution of sodium methoxide in methanol was added. After removal of the methanol in vacuo the residue was dissolved in 40 ml. of dimethylformamide and 8 ml. of methyl iodide was added. After standing for 3 hours at room temperature the solvent was evaporated in vacuo, the residue treated with ice water, and filtered. Crystallization from a mixture of dichloromethane and methanol gave crystals of 1-methyl-7-nitro-5-(2-nitrophenyl)-3H-1,4-benzodiazepin-2(1H)-one melting at 209–212°.

*Example 30*

A mixture of 12.3 g. of 2-amino-4,5-dimethyl-4'-nitrobenzophenone, 12.3 g. of hydroxylamine hydrochloride, 50 cc. of pyridine and 100 cc. of alcohol was refluxed for 20 hours, then diluted with water and partly concentrated in vacuo. The precipitated crystalline reaction product, 2-amino-4,5-dimethyl-4'-nitrobenzophenone oxime was filtered off and crystallized from methanol. It forms yellow prisms melting at 212–213°.

*Example 31*

To a warm solution of 11.4 g. of 2-amino-4,5-dimethyl-4'-nitrobenzophenone oxime in 175 cc. of acetic acid was added 9.04 g. of chloroacetyl chloride. After 2 hours standing at room temperature the mixture was saturated with hydrogen chloride, heated to 70° and concentrated in vacuo. The residue was dissolved in methylene chloride and washed with ice cold sodium carbonate solution. The organic solution was dried, concentrated to a small volume and diluted with petroleum ether. The precipitated reaction product, 6,7-dimethyl-2-chloromethyl-4-(4'-nitrophenyl)-quinazoline 3-oxide, was filtered off and crystallized from acetone. After recrystallization from acetone it forms yellow needles melting at 229–230°.

*Example 32*

To a suspension of 6.8 g. of 6,7-dimethyl-2-chloromethyl-4-(4'-nitrophenyl)-quinazoline 3-oxide in 100 cc. of ethanol was added 20 cc. of 1 N sodium hydroxide. The reaction mixture was heated to 40°, diluted with 40 cc. of acetone and stirred at room temperature for 17 hours. Some precipitated starting material was filtered off. The filtrate was concentrated in vacuo to a small volume, made alkaline with 20 cc. of 1 N sodium hydroxide and extracted with methylene chloride. The alkaline aqueous part was acidified with 40 cc. of 1 N hydrochloric acid and extracted with methylene chloride. The organic layer was dried, concentrated in vacuo to a small volume, treated with ether and yielded, after filtration, crude crystalline 7,8 - dimethyl - 5-(4'-nitrophenyl)-3H-1,4-benzodiazepin-2(1H)-one 4-oxide. The pure product, after crystallization from a mixture of methylene chloride and petroleum ether, forms slightly yellow plates melting at 254–255°.

*Example 33*

To 1.38 liters of benzoyl chloride heated to 120° was added, with stirring and continued heating, 566 g. of 4-chloro-2-methylaniline. At a temperture of 180°, 800 g. of zinc chloride was introduced. The temperature was then raised to 220–225° and maintained there for 1.5 hours. The temperautre was then decreased to about 150° and 2 liters of 3 N hydrochloric acid was cautiously added. The biphasic mixture was refluxed for about 5 minutes. The hot aqueous layer was decanted and the residue washed once more with the same amount of 3 N hydrochloric acid.

The residue was refluxed for 15 hours with a mixture of 600 cc. acetic acid, 375 cc. water and 700 cc. concentrated sulfuric acid. The reaction mixture was poured on ice and extracted with methylene chloride. The methylene chloride extract was washed with water, dilute alkali, dilute hydrochloric acid, separated, dried and concentrated in vacuo to dryness. The residue was crystallized from petroleum ether yielding crude product. Upon recrystallization from a mixture of ether and petroleum ether, the purified 2-amino-3-methyl-5-chlorobenzophenone formed yellow needles melting at 88.5–90°.

A mixture of 5.0 g. of activated charcoal (Norite–SG), 100 mls. of tetrahydrofuran, 5.0 mls. of 5% palladous chloride solution, 15.0 g. of powdered potassium acetate and 24.6 g. of 2-amino-3-methyl-5-chlorobenzophenone was shaken in a closed vessel in a hydrogen atmosphere (2 atmospheres pressure) until 0.1 mole of hydrogen was absorbed (5–6 hours). The mixture was then filtered and the yellow filtrate evaporated to a syrup in vacuo. The syrup was dissolved in methylene chloride and the solution washed with 3 N hydrochloric acid. The solvent layer was dried and evaporated in vacuo. The oily residue was crystallized from Skellysolve A to give purified 2-amino-3-methylbenzophenone melting at 51–52°.

To an ice cold solution of 27.6 g. of 2-amino-3-methylbenzophenone in 200 cc. benzene was added, in portions with stirring, 14 cc. of bromoacetyl bromide and 155 cc. of 1 N sodium hydroxide at such a rate as to keep the mixture slightly acidic. The organic layer was then separated and washed with dilute alkali and water. The benzene solution was dried, concentrated in vacuo to a small volume, and diluted with ether and petroleum ether. The precipitated crystals of 2-bromo-acetamido-3-methylbenzophenone melted at 117–118°.

A solution of 18.2 g. of 2-bromoacetamido-3-methylbenzophenone in 300 cc. of liquid ammonia was stirred at atmospheric pressure until the ammonia had evaporated (about 5 hours). The residue was dissolved in benzene and washed with water. The organic layer was dried and concentrated in vacuo. The residual syrup was dissolved in pyridine, refluxed for 3 hours, concentrated in vacuo to dryness. The residue was crystallized from a mixture of benzene and petroleum ether yielding 10.6 g. of crude reaction product. The purified 9-methyl-5-phenyl-3H-1,4-benzodiazepin-2(1H)-one was crystallized from a mixture of methylene chloride and petroleum ether. It formed colorless prisms melting at 184–185°.

The above-mentioned 9-methyl-5-phenyl-3H-1,4-benzodiazepin-2(1H)-one, its preparation and intermediates are not a part of this invention but are set forth above in order that this disclosure may be complete.

To a solution of 12.5 g. of crude 9-methyl-5-phenyl-3H-1,4-benzodiazepin-2(1H)-one in 80 cc. of concentrated sulfuric acid was added dropwise with stirring at 5–10° 5.3 g. of potassium nitrate dissolved in 30 cc. concentrated sulfuric acid. The mixture was stirred at room temperature for 2.5 hours then poured over ice and neutralized with ammonium hydroxide. The precipitated crude reaction product was filtered off and recrystallized from methylene chloride yielding crude 9-methyl - 7 - nitro-5-phenyl-3H-1,4-benzodiazepin-2-(1H)-one. Purified 9-methyl - 7 - nitro-5-phenyl-3H-1,4-benzodiazepin-2-(1H)-one was obtained by crystallization from large amounts of ether and formed colorless needles melting at 202–204°.

*Example 34*

To a solution of 32.7 g. of 4-methylanthranilic acid in 100 cc. of dimethylformamide cooled to −10° is added dropwise 20 cc. of thionyl chloride. The temperature rises to about 5°. The mixture is then stirred at room temperature for 3 hours, diluted with 600 cc. of acetone, cooled to +5° and stirred for an additional 3 hours. The reaction product, N-(2-carboxy-5-methylphenyl)-N',N'-dimethylformamide hydrochloride, is filtered off, washed with cool acetone and dried. After recrystallization from a mixture of acetonitrile and alcohol containing a small amount of hydrogen chloride, the product forms crystals melting at 196–198°.

A mixture of 500 cc. of benzene, 46 g. of phosphorus pentachloride and 48.7 g. of N-(2-carboxy-5-methylphenyl)-N',N'-dimethylformamide hydrochloride is refluxed and stirred for 1 hour and cooled to 25°. 130 g. of aluminum chloride and 50 cc. of benzene is added and the mixture is refluxed for 10 hours. 450 g. of ice is then added, the mixture is made alkaline with 700 cc. of 40% sodium hydroxide solution and refluxed for 5 hours. The benzene layer is separated, concentrated, and the residue refluxed with a mixture of 200 cc. of ethanol and 200 cc. of 20% sodium hydroxide for 12 hours. The alcohol and most of the water are removed in vacuo and, to the residue, 250 cc. of water and 150 cc. of benzene are added. The benzene layer is separated and concentrated in vacuo yielding crude 2-amino-4-methylbenzophenone. On treating with petroleum ether, a yellow crystalline precipitate is formed which is filtered off. It melts at 68–70°.

A mixture of 21.8 g. of 2-amino-4-methylbenzophenone, 100 cc. of pyridine, 1 cc. of piperidine, and 30 g. of glycine ethyl ester hydrochloride is refluxed for 16 hours. The reaction mixture is concentrated in vacuo and the residue is heated up with 150 cc. of benzene and 100 cc. of water. This mixture is then cooled to 10° and filtered. The crude product, 8-methyl-5-phenyl-3H-1,4-benzodiazepin-2(1H)-one, remaining on the funnel is washed with water and crystallized from a mixture of methanol and acetonitrile forming prisms melting at 255–256°.

The above-mentioned 8-methyl-5-phenyl-3H-1,4-benzodiazepin-2(1H)-one, its preparation and intermediates are not a part of this invention but are set forth above in order that this disclosure may be complete.

To a solution of 6.4 g. of crude 8-methyl-5-phenyl-3H-1,4-benzodiazepin-2(1H)-one in 100 cc. of concentrated sulfuric acid, are added at 10–15° 2.7 g. of potassium nitrate. The mixture is stirred for 30 minutes at room temperature, 90 minutes at 35°, and 75 minutes at 50°. It is then poured on about 700 g. of ice and neutralized at 0° with about 280 cc. of ammonia (30%). The reaction product, 8 - methyl - 7 - nitro-5-phenyl-3H-1,4-benzodiazepin-2(1H)-one, is filtered off, washed with water, and recrystallized from chlorobenzene and then from benzene. It forms colorless crystals melting at 218–219°.

Example 35

A solution of 1 g. of 9-methyl-7-nitro-5-phenyl-3H-1,4-benzodiazepin-2(1H)-one in a mixture of 25 cc. ethanol and 25 cc. 3-N hydrochloric acid was refluxed for 0.5 hour. The reaction product crystallized out during the reaction and was filtered off after cooling. The pure 2-amino-3-methyl - 5 - nitrobenzophenone was crystallized from ethanol and formed yellow needles melting at 204–205°.

Example 36

A solution of 1.2 g. of 8-methyl-7-nitro-5-phenyl-3H-1,4-benzodiazepin-2(1H)-one in a mixture of 25 cc. ethanol and 25 cc. 3 N hydrochloric acid was refluxed for 2 hours, then left at room temperature. The reaction product 2 - amino-4-methyl-5-nitrobenzophenone crystallized out and was filtered off. The 2-amino-4-methyl-5-nitrobenzophenone was crystallized from ether and formed yellow plates melting at 177–178°.

Example 37

A mixture of 176 g. of ortho-fluoro benzoyl chloride and 64 g. of para-chloroaniline was stirred and heated to 180°, at which temperature 87 g. of zinc chloride was introduced, the temperature raised to 200–205° and maintained there for forty minutes. The golden colored melt was quenched by the careful addition of 500 ml. of 3 N hydrochloric acid and the resulting mixture refluxed for five minutes. The acid solution was decanted and the process repeated three times to remove all ortho-fluorobenzoic acid. The grey granular residue was dissolved in 300 ml. of 75 percent (vol./vol.) sulphuric acid and refluxed for forty minutes to complete hydrolysis. The hot solution was poured over 1 kg. of ice and diluted to two liters with water. The organic material was extracted with four 300 ml. portions of methylene chloride, and the combined extracts subsequently washed with two 500 ml. portions of 3 N hydrochloric acid to remove traces of para-chloroaniline, three 500 ml. portions of 5 N sodium hydroxide solution to remove ortho-fluorobenzoic acid, and finally two 200 ml. portions of saturated brine solution. The combined methylene chloride extracts were dried over anhydrous sodium sulfate and the solvent removed to give the crude 2-amino-5-chloro-2'-fluorobenzophenone which upon recrystallization from methanol formed yellow needles melting at 94–95°.

50.0 g. of 2-amino-5-chloro-2'-fluorobenzophenone in 300 cc. of tetrahydrofuran was hydrogenated at atmospheric pressure in the presence of 10 g. of charcoal (Norite), 30.0 g. of potassium acetate and 2.5 cc. of a 20 percent palladous chloride solution (20 percent by weight of palladium). After an initiation period varying from ten minutes to an hour, hydrogen uptake was rapid and stopped completely after the absorption of the theoretical amount. Filtration of the catalyst over a "Hyflo" pad and removal of the solvent left a yellow crystalline residue. The crude mixture of ketone and potassium acetate was partitioned between methylene chloride (300 cc.) and water (1 l.). The layers were separated and the water layer washed with methylene chloride (3 x 50 cc.). The organic layers were combined, washed with 3 N sodium hydroxide solution (2 x 50 cc.), water (3 x 100 cc.), dried over anhydrous sodium sulfate and filtered. The solvent was removed and the product recrystallized from ethanol to give 2-amino-2'-fluorobenzophenone as yellow prisms melting at 126–128°.

A solution of 21.5 g. of 2-amino-2'-fluorobenzophenone in 500 cc. of ether was treated with 20 cc. of a 20 percent (v./v.) solution of bromoacetyl bromide in ether. The mixture was shaken and allowed to stand for five minutes and then washed with water (20 cc.). The process was repeated five times. The final solution was washed thoroughly with water (5 x 500 cc.) and concentrated to 100 cc. The crystals were filtered and recrystallized from methanol to give 2-bromoacetamido-2'-fluorobenzophenone as white needles melting at 117–118.5°.

A solution of 23.7 g. of 2-bromoacetamido-2'-fluoro-benzo-phenone in tetrahydrofuran (100 cc.) was added to liquid ammonia (approximately 500 cc.), and allowed to evaporate overnight. The residue was treated with water (1 l.) and the crystals filtered off and refluxed in toluene (100 cc.) for thirty minutes. The mixture was treated with decolorizing carbon (Norite) and filtered over "Hyflo." The solution was concentrated to a small volume (25 cc.), cooled, diluted with 20 cc. of ether and allowed to stand. The product was recrystallized from acetone/hexane to give 5-(2-fluorophenyl)-3H-1,4-benzodiazepin-2(1H)-one as white needles melting at 180–181°.

23.8 g. of 5-(2-fluorophenyl)-3H-1,4-benzodiazepin-2(1H)-one was dissolved in 50 cc. of concentrated sulfuric acid at 0°. To the resulting mixture there was then added dropwise with stirring a solution of 7.1 g. of potassium nitrite in 20 cc. of concentrated sulfuric acid. The mixture was stirred for 2½ hours at 0° and then diluted with 300 g. of ice. The resulting solution was made alkaline with concentrated ammonium hydroxide solution, keeping the temperature at 0°. The formed suspension was extracted thoroughly with methylene chloride (6 x 100 cc.). The organic layers were combined, washed with saturated brine solution, dried over anhydrous sodium sulfate, and filtered. Removal of the solvent yielded a brown gum which was taken up in a small amount of methylene chloride and filtered through a pad of grade I alumina. The alumina was eluted with methylene chloride, the solvent removed, and the residue crystallized from acetone/hexane to yield 7-nitro-5-(2-fluorophenyl) - 3H-1,4 - benzodiazepin - 2(1H) - one as white needles melting at 210–211°.

A solution of 11 g. of this product in a mixture of 150 ml. of ethanol and 100 ml. of 3 N hydrochloric acid was heated on a steam bath for 12 hours. The mixture was diluted with 100 ml. of water and allowed to cool to room temperature. The crystalline product was filtered, washed with water, dissolved in 200 ml. of methylene chloride, dried over anhydrous sodium sulfate, filtered, concentrated to a small volume, and diluted with ether, whereupon the product crystallized yielding 2-amino-5-nitro-2'-fluorobenzophenone as yellow needles melting at 154–158°.

20.2 g. of the above mentioned 7-nitro-5-(2-fluorophenyl)-3H-1,4-benzodiazepin-2(1H)-one was dissolved in 60 cc. of N,N-dimethyl formamide to which was then added 3.49 g. of a 50% suspension of sodium hydride in heavy mineral oil. The mixture was allowed to stir for 15 minutes in the cold, 11.2 g. of methyl iodide was added and the solution was stirred for a further 20 minutes. Solvent was removed under reduced pressure to give an oil which was partitioned between water and methylene chloride (1 l./300 cc.), the water layer was extracted with methylene chloride (5 x 200 cc.), the organic layers combined, washed with water (2 x 100 cc.), 3 N hydrochloric acid (1 x 50 cc), water (3 x 100 cc.), dried over anhydrous sodium sulfate and filtered. Removal of the solvent gave an oil which was taken up in ether and filtered through a pad of Woelm grade I alumina. The eluent was concentrated and the residue was crystallized from methylene chloride/hexane yielding 1- methyl-7-nitro-5-(2-fluorophenyl) - 3H-1,4-benzodiazepin-2(1H)-one as pale yellow needles melting at 166–167°. A solution of 12.0 g. of this product in a mixture of 150 ml. of ethanol and 100 ml. of 3 N hydrochloric acid was heated on a steam bath for 12 hours. The mixture was diluted with 100 ml. of water and allowed to cool at room temperature. The crystalline product was filtered, washed with water (5 x 200 ml.). The ketone was dissolved in 200 ml. of methylene chloride, dried over anhydrous sodium sulfate, filtered, concentrated to 50 ml. and diluted with 150 ml. of ether yielding 2-(N-methylamino)-5-nitro-2′-fluorobenzophenone as pale yellow needles melting at 186–187°.

A mixture of 5 g. of the above mentioned 7-nitro-5-(2-fluorophenyl)-3H-1,4-benzodiazepin-2(1H)-one and 1 g. of Raney nickel was hydrogenated to completion at atmospheric pressure and at room temperature. The reaction was slow but stopped after uptake of 0.0498 mole of hydrogen. The catalyst was filtered off and the solvent concentrated to about 15 cc. The crystals obtained from the cooled solution were filtered and crystallized from methanol, yielding 7-amino-5-(2-fluorophenyl)-3H-1,4-benzodiazepin-2(1H)-one as yellow prisms melting at 264–266°.

The above mentioned 5-(2-fluorophenyl)-3H-1,4-benzodiazepin-2(1H)-one, the method for its preparation and the intermediates therefor are not a part of the present invention, but such are discussed above in order that the present disclosure may be complete.

*Example 38*

To a solution of 5 g. of 7-nitro-5-(4-chlorophenyl)-3H-1,4-benzodiazepin-2(1H)-one in 15 ml. of dimethylformamide, a solution of 0.402 g. of sodium in 4 ml. of methanol was added, and then the mixture was stirred for 30 minutes at room temperature. The solution of the sodio derivative was cooled to —5° and 11.5 g. of methyl iodide was added thereto dropwise over ten minutes, keeping the temperature between —3° and 0°. Stirring was continued for ten minutes at 0° and then at room temperature for one hour. The mixture was poured into 1 l. of water and the product extracted with methylene chloride (3 x 150 ml.). The organic extracts were combined, washed with water (3 x 200 ml.), dried over anhydrous sodium sulfate, and filtered over a small column of alumina (100 g., neutral, grade 1). The solvent upon evaporation gave an oil, which was crystallized from an acetone/hexane mixture yielding 5-(4-chlorophenyl)-1-methyl-7-nitro-3H-1,4-benzodiazepin-2(1H)-one as colorless rods, melting at 131–135°.

A solution of 0.6 g. of 5-(4-chlorophenyl)-1-methyl-7-nitro-3H-1,4-benzodiazepin-2(1H)-one in a mixture of 70 ml. of ethanol and 45 ml. of 3 N hydrochloric acid was heated on a steam bath for 12 hours. The mixture was diluted with 50 ml. of water and allowed to cool to room temperature. The crystalline product was filtered, washed with water, dissolved in 100 ml. of methylene chloride; the solution was dried over anhydrous sodium sulfate, filtered and concentrated to dryness. The residue was crystallized from methanol, yielding 2-(N-methylamino)-4′-chlorobenzophenone as yellow needles melting at 207.5–208°.

*Example 39*

A solution of 29.5 of 1-methyl-7-nitro-5-phenyl-3H-1,4-benzodiazepin-2(1H)-one in 500 ml. of ethanol was hydrogenated at room temperature and atmospheric pressure for four hours in the presence of 0.7 g. of wet Raney nickel. Filtration, followed by concentration of the filtrate, yielded crude product which upon recrystallization from ethanol gave 7-amino-1-methyl-5-phenyl-3H-1,4-benzodiazepin-2(1H)-one as yellow prisms melting at 238–240°.

*Example 40*

A solution of 10 g. of 7-nitro-5-(2-chlorophenyl)-3H-1,4-benzodiazepin-2(1H)-one in 1 l. of ethanol was hydrogenated overnight at room temperature and atmospheric pressure in the presence of 0.6 g. of wet Raney nickel. Filtration and concentration of the filtrate yielded 7 - amino-5-(2-chlorophenyl)-3H-1,4 - benzodiazepin - 2-(1H)-one as yellow needles which, upon recrystallization from ethanol, melted at 230–232°.

*Example 41*

1.0 g. of platinum oxide in 150 cc. of acetic acid was reduced at atmospheric pressure and room temperature. To the suspension of reduced catalyst a solution of 25.0 g. of 5-(2-fluorophenyl)-3H-1,4-benzodiazepin-2(1H)-one in 150 cc. of glacial acetic acid was added, and the mixture was then hydrogenated to completion (2150 cc. of hydrogen absorbed). Filtration and concentration of the filtrate under reduced pressure gave crude product which was dissolved in methylene chloride (150 cc.), the resulting solution was washed with a 5 N ammonium hydroxide solution (3 x 25 cc.), water (3 x 25 cc.), dried over anhydrous sodium sulfate, filtered and evaporated. Recrystallization of the residue from methylene chloride yielded 4,5-dihydro-5-(2-fluorophenyl)-3H-1,4-benzodiazepin - 2-(1H)-one as white needles melting at 162–163°.

A mixture of 1.8 cc. of fuming nitric acid (90%) and 5 cc. of concentrated sulfuric acid was added dropwise to 10 g. of 4,5-dihydro-5-(2-fluorophenyl)-3H-1,4-benzodiazepin-2(1H)-one dissolved in 75 cc. of ice-cold concentrated sulfuric acid. The resultant mixture was stirred for one hour at 0°. Keeping the temperature at 0°, the solution was made alkaline to pH 8 with concentrated ammonium hydroxide solution. The resulting crystalline precipitate was filtered, washed with water (500 cc.) and dissolved in 200 cc. of methylene chloride. The methylene chloride solution was treated with decolorizing charcoal (Norite, 0.3 g.), dried over anhydrous sodium sulfate, filtered and concentrated to a small volume. Fractional crystallization from an ether/methylene chloride mixture yielded 7,9-dinitro-4,5-dihydro-3H-1,4 - benzodiazepin-2-(1H)-one, melting at 200–211°. Further concentration of the mother liquors and crystallization from acetone/petroleum ether (60–80° range) yielded 7-nitro-3H-1,4-benzodiazepin-2(1H)-one melting at 188–189°.

The above mentioned 4,5-dihydro-5-(2-fluorophenyl)-3H-1,4-benzodiazepin-2(1H)-one, the method for its preparation and the intermediates therefor are not a part of the present invention, but such are described above in order that the present disclosure may be complete.

*Example 42*

Nitration of 5-(2-fluorophenyl)-3H-1,4-benzodiazepin-2(1H)-one was conducted as described in Example 37 above, except that potassium nitrate was added in excess (2.4 equivalents) and at a temperature of approximately 50°. The reaction mixture was then worked up as described in Example 37. The resulting brown gum consisting of a mixture of 7-nitro-5-(2-fluorophenyl)-3H-1,4-benzodiazepin-2(1H)-one and 7,9-dinitro-5-(2-fluorophenyl)-3H-1,4-benzodiazepin-2(1H)-one was treated with cold methylene chloride. The dinitro compound remained undissolved, was filtered off and then crystallized from acetone yielding 7,9-dinitro-5-(2-fluorophenyl)-3H-1,4-benzodiazepin-2(1H)-one as white prisms melting at 292–3°.

A solution of 5.0 g. of 7,9-dinitro-5-(2-fluorophenyl)-3H-1,4-benzodiazepin-2(1H)-one in 50 ml. of ethanol and 35 ml. of 3 N hydrochloric acid was heated on a steam bath for 12 hours. The mixture was diluted with 35 ml. of water and allowed to cool to room temperature. The crystalline product was filtered and washed with water, dissolved in 70 ml. of methylene chloride, dried over anhydrous sodium sulfate, filtered, concentrated to a small volume and diluted with methanol, whereupon the product crystallized yielding 2-amino-3,5-dinitro-2′-fluorobenzophenone as yellow needles melting above 350°.

not a part of this invention but are set forth above in order that this disclosure may be complete.

To a solution of 6.4 g. of crude 8-methyl-5-phenyl-3H-1,4-benzodiazepin-2(1H)-one in 100 cc. of concentrated sulfuric acid, are added at 10–15° 2.7 g. of potassium nitrate. The mixture is stirred for 30 minutes at room temperature, 90 minutes at 35°, and 75 minutes at 50°. It is then poured on about 700 g. of ice and neutralized at 0° with about 280 cc. of ammonia (30%). The reaction product, 8 - methyl - 7 - nitro-5-phenyl-3H-1,4-benzodiazepin-2(1H)-one, is filtered off, washed with water, and recrystallized from chlorobenzene and then from benzene. It forms colorless crystals melting at 218–219°.

*Example 35*

A solution of 1 g. of 9-methyl-7-nitro-5-phenyl-3H-1,4-benzodiazepin-2(1H)-one in a mixture of 25 cc. ethanol and 25 cc. 3-N hydrochloric acid was refluxed for 0.5 hour. The reaction product crystallized out during the reaction and was filtered off after cooling. The pure 2-amino-3-methyl - 5 - nitrobenzophenone was crystallized from ethanol and formed yellow needles melting at 204–205°.

*Example 36*

A solution of 1.2 g. of 8-methyl-7-nitro-5-phenyl-3H-1,4-benzodiazepin-2(1H)-one in a mixture of 25 cc. ethanol and 25 cc. 3 N hydrochloric acid was refluxed for 2 hours, then left at room temperature. The reaction product 2 - amino-4-methyl-5-nitrobenzophenone crystallized out and was filtered off. The 2-amino-4-methyl-5-nitrobenzophenone was crystallized from ether and formed yellow plates melting at 177–178°.

*Example 37*

A mixture of 176 g. of ortho-fluoro benzoyl chloride and 64 g. of para-chloroaniline was stirred and heated to 180°, at which temperature 87 g. of zinc chloride was introduced, the temperature raised to 200–205° and maintained there for forty minutes. The golden colored melt was quenched by the careful addition of 500 ml. of 3 N hydrochloric acid and the resulting mixture refluxed for five minutes. The acid solution was decanted and the process repeated three times to remove all ortho-fluorobenzoic acid. The grey granular residue was dissolved in 300 ml. of 75 percent (vol./vol.) sulphuric acid and refluxed for forty minutes to complete hydrolysis. The hot solution was poured over 1 kg. of ice and diluted to two liters with water. The organic material was extracted with four 300 ml. portions of methylene chloride, and the combined extracts subsequently washed with two 500 ml. portions of 3 N hydrochloric acid to remove traces of para-chloroaniline, three 500 ml. portions of 5 N sodium hydroxide solution to remove ortho-fluorobenzoic acid, and finally two 200 ml. portions of saturated brine solution. The combined methylene chloride extracts were dried over anhydrous sodium sulfate and the solvent removed to give the crude 2-amino-5-chloro-2'-fluorobenzophenone which upon recrystallization from methanol formed yellow needles melting at 94–95°.

50.0 g. of 2-amino-5-chloro-2'-fluorobenzophenone in 300 cc. of tetrahydrofuran was hydrogenated at atmospheric pressure in the presence of 10 g. of charcoal (Norite), 30.0 g. of potassium acetate and 2.5 cc. of a 20 percent palladous chloride solution (20 percent by weight of palladium). After an initiation period varying from ten minutes to an hour, hydrogen uptake was rapid and stopped completely after the absorption of the theoretical amount. Filtration of the catalyst over a "Hyflo" pad and removal of the solvent left a yellow crystalline residue. The crude mixture of ketone and potassium acetate was partitioned between methylene chloride (300 cc.) and water (1 l.). The layers were separated and the water layer washed with methylene chloride (3 x 50 cc.). The organic layers were combined, washed with 3 N sodium hydroxide solution (2 x 50 cc.), water (3 x 100 cc.), dried over anhydrous sodium sulfate and filtered. The solvent was removed and the product recrystallized from ethanol to give 2-amino-2'-fluorobenzophenone as yellow prisms melting at 126–128°.

A solution of 21.5 g. of 2-amino-2'-fluorobenzophenone in 500 cc. of ether was treated with 20 cc. of a 20 percent (v./v.) solution of bromoacetyl bromide in ether. The mixture was shaken and allowed to stand for five minutes and then washed with water (20 cc.). The process was repeated five times. The final solution was washed thoroughly with water (5 x 500 cc.) and concentrated to 100 cc. The crystals were filtered and recrystallized from methanol to give 2-bromoacetamido-2'-fluorobenzophenone as white needles melting at 117–118.5°.

A solution of 23.7 g. of 2-bromoacetamido-2'-fluoro-benzo-phenone in tetrahydrofuran (100 cc.) was added to liquid ammonia (approximately 500 cc.), and allowed to evaporate overnight. The residue was treated with water (1 l.) and the crystals filtered off and refluxed in toluene (100 cc.) for thirty minutes. The mixture was treated with decolorizing carbon (Norite) and filtered over "Hyflo." The solution was concentrated to a small volume (25 cc.) cooled, diluted with 20 cc. of ether and allowed to stand. The product was recrystallized from acetone/hexane to give 5-(2-fluorophenyl)-3H-1,4-benzodiazepin-2(1H)-one as white needles melting at 180–181°.

23.8 g. of 5-(2-fluorophenyl)-3H-1,4-benzodiazepin-2(1H)-one was dissolved in 50 cc. of concentrated sulfuric acid at 0°. To the resulting mixture there was then added dropwise with stirring a solution of 7.1 g. of potassium nitrite in 20 cc. of concentrated sulfuric acid. The mixture was stirred for 2½ hours at 0° and then diluted with 300 g. of ice. The resulting solution was made alkaline with concentrated ammonium hydroxide solution, keeping the temperature at 0°. The formed suspension was extracted thoroughly with methylene chloride (6 x 100 cc.). The organic layers were combined, washed with saturated brine solution, dried over anhydrous sodium sulfate, and filtered. Removal of the solvent yielded a brown gum which was taken up in a small amount of methylene chloride and filtered through a pad of grade I alumina. The alumina was eluted with methylene chloride, the solvent removed, and the residue crystallized from acetone/hexane to yield 7-nitro-5-(2-fluorophenyl) - 3H-1,4 - benzodiazepin - 2(1H) - one as white needles melting at 210–211°.

A solution of 11 g. of this product in a mixture of 150 ml. of ethanol and 100 ml. of 3 N hydrochloric acid was heated on a steam bath for 12 hours. The mixture was diluted with 100 ml. of water and allowed to cool to room temperature. The crystalline product was filtered, washed with water, dissolved in 200 ml. of methylene chloride, dried over anhydrous sodium sulfate, filtered, concentrated to a small volume, and diluted with ether, whereupon the product crystallized yielding 2-amino-5-nitro-2'-fluorobenzophenone as yellow needles melting at 154–158°.

20.2 g. of the above mentioned 7-nitro-5-(2-fluorophenyl)-3H-1,4-benzodiazepin-2(1H)-one was dissolved in 60 cc. of N,N-dimethyl formamide to which was then added 3.49 g. of a 50% suspension of sodium hydride in heavy mineral oil. The mixture was allowed to stir for 15 minutes in the cold, 11.2 g. of methyl iodide was added and the solution was stirred for a further 20 minutes. Solvent was removed under reduced pressure to give an oil which was partitioned between water and methylene chloride (1 l./300 cc.), the water layer was extracted with methylene chloride (5 x 200 cc.), the organic layers combined, washed with water (2 x 100 cc.), 3 N hydrochloric acid (1 x 50 cc), water (3 x 100 cc.), dried over anhydrous sodium sulfate and filtered. Removal of the solvent gave an oil which was taken up in ether and filtered through a pad of Woelm grade I alumina. The eluent was concentrated and the residue was crystallized from methylene chloride/hexane yielding 1- methyl-7-nitro-5-(2-fluorophenyl) - 3H-1,4-benzodiazepin-2(1H)-one as pale yellow needles melting at 166–167°. A solution of 12.0 g. of this product in a mixture of 150 ml. of ethanol and 100 ml. of 3 N hydrochloric acid was heated on a steam bath for 12 hours. The mixture was diluted with 100 ml. of water and allowed to cool at room temperature. The crystalline product was filtered, washed with water (5 x 200 ml.). The ketone was dissolved in 200 ml. of methylene chloride, dried over anhydrous sodium sulfate, filtered, concentrated to 50 ml. and diluted with 150 ml. of ether yielding 2-(N-methylamino)-5-nitro-2'-fluorobenzophenone as pale yellow needles melting at 186–187°.

A mixture of 5 g. of the above mentioned 7-nitro-5-(2-fluorophenyl)-3H-1,4-benzodiazepin-2(1H)-one and 1 g. of Raney nickel was hydrogenated to completion at atmospheric pressure and at room temperature. The reaction was slow but stopped after uptake of 0.0498 mole of hydrogen. The catalyst was filtered off and the solvent concentrated to about 15 cc. The crystals obtained from the cooled solution were filtered and crystallized from methanol, yielding 7-amino-5-(2-fluorophenyl)-3H-1,4-benzodiazepin-2(1H)-one as yellow prisms melting at 264–266°.

The above mentioned 5-(2-fluorophenyl)-3H-1,4-benzodiazepin-2(1H)-one, the method for its preparation and the intermediates therefor are not a part of the present invention, but such are discussed above in order that the present disclosure may be complete.

*Example 38*

To a solution of 5 g. of 7-nitro-5-(4-chlorophenyl)-3H-1,4-benzodiazepin-2(1H)-one in 15 ml. of dimethylformamide, a solution of 0.402 g. of sodium in 4 ml. of methanol was added, and then the mixture was stirred for 30 minutes at room temperature. The solution of the sodio derivative was cooled to —5° and 11.5 g. of methyl iodide was added thereto dropwise over ten minutes, keeping the temperature between —3° and 0°. Stirring was continued for ten minutes at 0° and then at room temperature for one hour. The mixture was poured into 1 l. of water and the product extracted with methylene chloride (3 x 150 ml.). The organic extracts were combined, washed with water (3 x 200 ml.), dried over anhydrous sodium sulfate, and filtered over a small column of alumina (100 g., neutral, grade 1). The solvent upon evaporation gave an oil, which was crystallized from an acetone/hexane mixture yielding 5-(4-chlorophenyl)-1-methyl-7-nitro-3H-1,4-benzodiazepin-2(1H)-one as colorless rods, melting at 131–135°.

A solution of 0.6 g. of 5-(4-chlorophenyl)-1-methyl-7-nitro-3H-1,4-benzodiazepin-2(1H)-one in a mixture of 70 ml. of ethanol and 45 ml. of 3 N hydrochloric acid was heated on a steam bath for 12 hours. The mixture was diluted with 50 ml. of water and allowed to cool to room temperature. The crystalline product was filtered, washed with water, dissolved in 100 ml. of methylene chloride; the solution was dried over anhydrous sodium sulfate, filtered and concentrated to dryness. The residue was crystallized from methanol, yielding 2-(N-methylamino)-4'-chlorobenzophenone as yellow needles melting at 207.5–208°.

*Example 39*

A solution of 29.5 of 1-methyl-7-nitro-5-phenyl-3H-1,4-benzodiazepin-2(1H)-one in 500 ml. of ethanol was hydrogenated at room temperature and atmospheric pressure for four hours in the presence of 0.7 g. of wet Raney nickel. Filtration, followed by concentration of the filtrate, yielded crude product which upon recrystallization from ethanol gave 7-amino-1-methyl-5-phenyl-3H-1,4-benzodiazepin-2(1H)-one as yellow prisms melting at 238–240°.

*Example 40*

A solution of 10 g. of 7-nitro-5-(2-chlorophenyl)-3H-1,4-benzodiazepin-2(1H)-one in 1 l. of ethanol was hydrogenated overnight at room temperature and atmospheric pressure in the presence of 0.6 g. of wet Raney nickel. Filtration and concentration of the filtrate yielded 7 - amino-5-(2-chlorophenyl)-3H-1,4 - benzodiazepin - 2-(1H)-one as yellow needles which, upon recrystallization from ethanol, melted at 230–232°.

*Example 41*

1.0 g. of platinum oxide in 150 cc. of acetic acid was reduced at atmospheric pressure and room temperature. To the suspension of reduced catalyst a solution of 25.0 g. of 5-(2-fluorophenyl)-3H-1,4-benzodiazepin-2(1H)-one in 150 cc. of glacial acetic acid was added, and the mixture was then hydrogenated to completion (2150 cc. of hydrogen absorbed). Filtration and concentration of the filtrate under reduced pressure gave crude product which was dissolved in methylene chloride (150 cc.), the resulting solution was washed with a 5 N ammonium hydroxide solution (3 x 25 cc.), water (3 x 25 cc.), dried over anhydrous sodium sulfate, filtered and evaporated. Recrystallization of the residue from methylene chloride yielded 4,5-dihydro-5-(2-fluorophenyl)-3H-1,4-benzodiazepin - 2-(1H)-one as white needles melting at 162–163°.

A mixture of 1.8 cc. of fuming nitric acid (90%) and 5 cc. of concentrated sulfuric acid was added dropwise to 10 g. of 4,5-dihydro-5-(2-fluorophenyl)-3H-1,4-benzodiazepin-2(1H)-one dissolved in 75 cc. of ice-cold concentrated sulfuric acid. The resultant mixture was stirred for one hour at 0°. Keeping the temperature at 0°, the solution was made alkaline to pH 8 with concentrated ammonium hydroxide solution. The resulting crystalline precipitate was filtered, washed with water (500 cc.) and dissolved in 200 cc. of methylene chloride. The methylene chloride solution was treated with decolorizing charcoal (Norite, 0.3 g.), dried over anhydrous sodium sulfate, filtered and concentrated to a small volume. Fractional crystallization from an ether/methylene chloride mixture yielded 7,9-dinitro-4,5-dihydro-3H-1,4 - benzodiazepin-2-(1H)-one, melting at 200–211°. Further concentration of the mother liquors and crystallization from acetone/petroleum ether (60–80° range) yielded 7-nitro-3H-1,4-benzodiazepin-2(1H)-one melting at 188–189°.

The above mentioned 4,5-dihydro-5-(2-fluorophenyl)-3H-1,4-benzodiazepin-2(1H)-one, the method for its preparation and the intermediates therefor are not a part of the present invention, but such are described above in order that the present disclosure may be complete.

*Example 42*

Nitration of 5-(2-fluorophenyl)-3H-1,4-benzodiazepin-2(1H)-one was conducted as described in Example 37 above, except that potassium nitrate was added in excess (2.4 equivalents) and at a temperature of approximately 50°. The reaction mixture was then worked up as described in Example 37. The resulting brown gum consisting of a mixture of 7-nitro-5-(2-fluorophenyl)-3H-1,4-benzodiazepin-2(1H)-one and 7,9-dinitro-5-(2-fluorophenyl)-3H-1,4-benzodiazepin-2(1H)-one was treated with cold methylene chloride. The dinitro compound remained undissolved, was filtered off and then crystallized from acetone yielding 7,9-dinitro-5-(2-fluorophenyl)-3H-1,4-benzodiazepin-2(1H)-one as white prisms melting at 292–3°.

A solution of 5.0 g. of 7,9-dinitro-5-(2-fluorophenyl)-3H-1,4-benzodiazepin-2(1H)-one in 50 ml. of ethanol and 35 ml. of 3 N hydrochloric acid was heated on a steam bath for 12 hours. The mixture was diluted with 35 ml. of water and allowed to cool to room temperature. The crystalline product was filtered and washed with water, dissolved in 70 ml. of methylene chloride, dried over anhydrous sodium sulfate, filtered, concentrated to a small volume and diluted with methanol, whereupon the product crystallized yielding 2-amino-3,5-dinitro-2'-fluorobenzophenone as yellow needles melting above 350°.

Example 43

A solution of 0.3 g. of 9-nitro-7-chloro-5-phenyl-3H-1,4-benzodiazepin-2(1H)-one in a mixture of 10 ml. of 3 N hydrochloric acid and 10 ml. of ethanol was refluxed for 4.5 hours. The reaction mixture was made alkaline with dilute potassium hydroxide and extracted with methylene chloride. The organic layer was separated, dried and concentrated in vacuo to dryness. The residue was crystallized from dilute ethanol yielding crude reaction product, which after recrystallization from a mixture of ether and petroleum ether yielded 2-amino-3-nitro-5-chlorobenzophenone as orange prisms melting at 128–9°.

Example 44

A solution of 1 g. of 7-nitro-5-(4-chlorophenyl)-3H-1,4-benzodiazepin-2(1H)-one in a mixture of 25 ml. of 3 N hydrochloric acid and 25 ml. of ethanol was refluxed on the steambath for 35 minutes. The reaction mixture was cooled and the crude reaction product filtered off. Recrystallization from ethanol yielded 2-amino-5-nitro-4'-chlorobenzophenone as yellow needles melting as 196–7°.

Example 45

A solution of 2 g. of 7-nitro-5-(2-nitrophenyl)-3H-1,4-benzodiazepin-2(1H)-one in a mixture of 20 ml. of acetic acid and 30 ml. of concentrated hydrochloric acid was refluxed for 17 hours. The solution was then cooled, poured on ice, neutralized with ammonia and extracted with ether. The ether solution was washed with water, dried and evaporated. The residue was recrystallized from ethanol yielding 2-amino-2',5-dinitrobenzophenone as dark orange prisms which melted at 199–202°.

Example 46

A solution of 1 g. of 5-(2-chlorophenyl)-7-nitro-3H-1,4-benzodiazepin-2(1H)-one in a mixture of 25 ml. of ethanol and 25 ml. of 3 N hydrochloric acid was refluxed for 3 hours. After the main amount of ethanol was removed in vacuo the solution was cooled. The crystalline precipitate was collected on a filter and recrystallized from ethanol yielding 2-amino-2'-chloro-5-nitrobenzophenone as yellow prisms melting at 118–120°.

We claim:
1. A compound of the formula

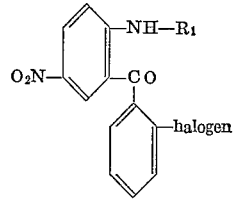

wherein $R_1$ is selected from the group consisting of hydrogen and lower alkyl.
2. 2-amino-2'-halo-5-nitrobenzophenone.
3. 2-amino-2'-chloro-5-nitrobenzophenone.
4. 2-amino-2'-fluoro-5-nitrobenzophenone.
5. 2'-halo-2-(N-methylamino)-5-nitrobenzophenone.
6. 2'-fluoro-2-(N-methylamino)-5-nitrobenzophenone.

References Cited by the Examiner

UNITED STATES PATENTS 2,893,992  7/59  Sternback _____ 260—570 X

OTHER REFERENCES

Abramovitch et al., "Jour. Chemical Soc. (London)," 1957, page 1784.

Chardonnens et al., "Chemical Abstracts," vol. 40 (1946), page 1479.

Heacock et al., "Chem. Abs." vol. 47, page 1090f.

Schofield et al., "Jour. Chemical Soc. (London)," 1950, pages 1505–9.

CHARLES B. PARKER, *Primary Examiner.*

LEON ZITVER, *Examiner.*

UNITED STATES PATENT OFFICE
CERTIFICATE OF CORRECTION

Patent No. 3,203,990                                August 31, 1965

Oscar Keller et al.

It is hereby certified that error appears in the above numbered patent requiring correction and that the said Letters Patent should read as corrected below.

Column 1, lines 45 to 47, strike out "wherein A represents a carbon nitrogen linkage which completes the 7-membered diazepine ring and which is selected from the group consisting of" and insert the same after formula (I), between lines 37 and 38; same column 1, line 61, beginning with "$R_1$ and $R_2$ are each" strike out all to and including "forth as follows: " in column 2, line 4, and insert the same before formula (II), at line 45, same column 1; column 2, formula (III), should appear as shown below instead of as in the patent:

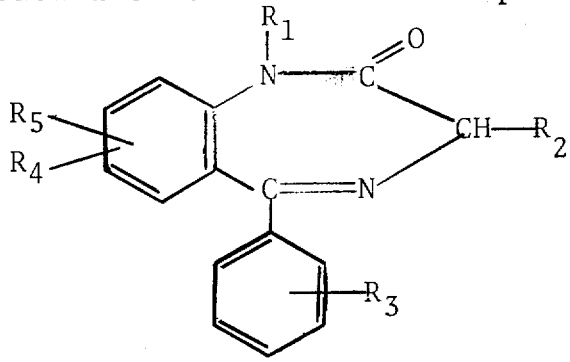

line 59, for "(form" read -- form --; line 62, for "phermaceutically" read -- pharmaceutically --; column 3, line 16, for "$R_a$" read -- $R_2$ --; line 66, for "apaprent" read -- apparent --; column 4, line 26, for "-2(1 H)-" read -- -2(1H)- --; line 66, for "p-position" read -- 5-position --; column 5, line 16, for "conissting" read -- consisting --; line 53, for "160° cc." read -- 160 cc. --; column 7, line 6, for "an" read -- and --; column 9, line 1, for "accompanied" read -- accomplished --; column 10, line 53, for "tetra hydrofuran" read -- tetrahydrofuran --; column 14, line 13, strike out "acetanilidee melting at 157-159°."; column 18, line 16, for "benzophenone" read -- benzophenone --; column 19, line 35, for "added. and" read -- added, and --.

Signed and sealed this 5th day of July 1966.

(SEAL)
Attest:

ERNEST W. SWIDER                                EDWARD J. BRENNER
Attesting Officer                                Commissioner of Patents